March 14, 1967 W. V. RAUSCH ETAL 3,309,638

COIL ARRANGEMENT FOR IMPROVED FIELD UNIFORMITY

Filed May 7, 1965 2 Sheets-Sheet 1

INVENTORS
WILLIAM V. RAUSCH
ARTHUR CALDERON
BY
Braddock + Burd
ATTORNEYS

March 14, 1967 W. V. RAUSCH ETAL 3,309,638

COIL ARRANGEMENT FOR IMPROVED FIELD UNIFORMITY

Filed May 7, 1965 2 Sheets-Sheet 2

INVENTORS
WILLIAM V. RAUSCH
ARTHUR CALDERON
BY
Braddock & Bird
ATTORNEYS 3,309,638
COIL ARRANGEMENT FOR IMPROVED FIELD UNIFORMITY William V. Rausch, 1450 N. Larch Lane, Minneapolis, Minn. 55427, and Arthur Calderon, 2514 Cedarwood Ridge, Minnetonka, Minn. 55343
Filed May 7, 1965, Ser. No. 454,148
5 Claims. (Cl. 335—299)

This invention relates to an electromagnetic coil arrangement for improving the uniformity of a magnetic field over the planar substrate area of ferro-magnetic thin film deposition apparatus and, more particularly, to a pair of series aiding cylindrically warped elliptical electromagnetic coils positioned partially around a deposition chamber containing a substrate material to provide a more uniform magnetic field across the planar surface of the substrate material.

In modern computing equipment, memory storage elements often consist of bi-stable ferro-magnetic thin films which are produced by vacuum deposition of a vaporized metal onto a heated substrate material in the presence of an orienting field. During the evaporation process, the substrate material is maintained at an elevated temperature, and a magnetic field is applied in the plane defined by the substrate material. The vaporized metal condenses on the substrate material and is allowed to cool in the presence of the magnetic field. The combination of heated substrate and the magnetic field (in some presently unexplained way), is responsible for the establishment of a preferred or "easy" axis of magnetization of the thin film. The "easy" axis of magnetization is in the direction of the applied magnetic field, while the planar axis perpendicular to the direction of the orienting field is the "hard" axis of magnetization.

Normally, a large number of thin films are simultaneously deposited upon one or more planar substrates. For economic reasons, as large a substrate area as possible is coated in a single deposition. The location and arrangement of the individual thin films is determined by a stencil mask with an open pattern of the desired thin film arrangement which is placed over the substrate during deposition. It is essential for proper computer operation that the "easy" axes of all of the bi-stable thin films be substantially parallel. This requires that the direction of the magnetic field across the planar substrate surface be uniform during deposition. It is preferable to locate the electromagnetic coils outside of the deposition chamber to reduce interference with the deposition process, although this makes the creation of a uniform magnetic field more difficult and, consequently, limits the total number of bi-stable elements that can be deposited in a single deposition cycle, which increases the overall cost of the elements. Large and complex electromagnetic coil arrangements have previously been designed which will produce a magnetic field of substantially parallel lines of flux across a relatively small planar area. In order that externally situated circular coils, whose center axes coincide, can create a satisfactory magnetic field across the substrate area, their diameters must be approximately twice the diameter of the deposition chamber if the outside diameter or dimension of the deposition chamber equals the coil spacing. This means that for a typical deposition chamber of a diameter of two feet, the diameter of each electromagnetic coil must be approximately four feet. In this case the coils would require an additional space allotment of about 16 cubic feet. The reason that such large circular coils are required is that the lines of flux established between them tend to diverge, or bulge out, as the perpendicular distance from the axes of the coils increases. The width of the area near the coil axes in which the magnetic field is satisfactorily uniform is proportional to the diameter of the two coils and the spacing between them, the magnetic field in a given area near the axes of large coils being less distorted than when near the axes of small coils, if the spacing of the coils is the same in both cases. In other words, larger circular coils will produce a larger area of uniform lines of flux. However, use of these larger coils is very undesirable for two reasons: first, the design of most commercial evaporators does not allow the installation of coils of diameters equal to twice the diameter or dimension of the vacuum chamber, such that the coil co-axis is in the plane of the substrates; and second, installation of large coils would make loading and unloading of the chamber very cumbersome, time consuming and costly.

The present invention creates a nearly uniform magnetic field by making physical adjustments to a set of series aiding circular coils. In the process, circular coils are wound having a diameter equal to the diameter of the deposition chamber. The wire used and the manner of winding must leave the coils somewhat flexible to allow subsequent changes in shape. These circular coils are then flattened into coils of ellipse-like shape, hereafter referred to as elliptical coils although they need not be perfectly elliptical, such that the ratio of the original diameter of the circular coil to the minor axis of the resulting elliptical coil is approximately 1.5. The major axis is then approximately twice the length of the minor axes. The elliptical coils are then formed around the bell jar in such a way that the major axis of each elliptical coil is in the same plane as the substrate. Experimental observation of the effects of the magnetic field on iron filings has shown that a ratio of the original diameter of the coil to the minor axis of the intermediate elliptical coil of approximately 1.5 produces a magnetic field of satisfactory uniformity for use in this film deposition processes over large substrate areas (up to 64 sq. in.) when the coil is warped around the bell jar. The coils in final configuration may be termed cylindrically warped elliptical coils.

It is an object of this invention to provide apparatus for producing a magnetic field with nearly parallel lines of flux across a large planar surface.

It is another object of this invention to provide apparatus for producing a nearly uniform magnetic field with simple and inexpensive electromagnetic coils.

It is a further object of this invention to minimize the weight and overall volume of the electromagnetic coils.

These and other objects of this invention will become apparent upon consideration of the accompanying claims, specification and drawings, of which:

Figure 1:
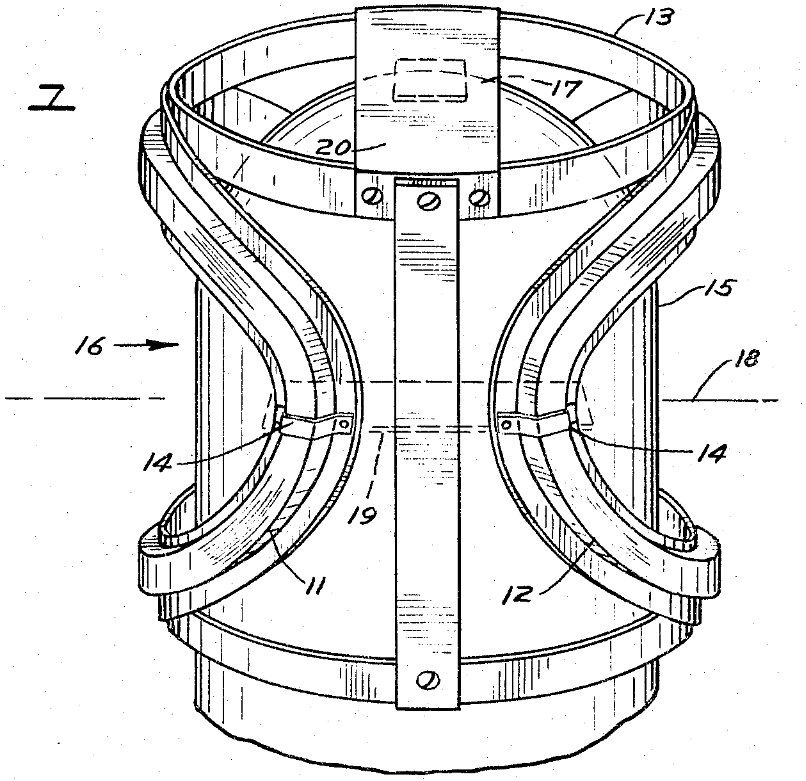
FIG. 1 is a perspective view of a pair of cylindrically warped elliptical electromagnetic coils of this invention supported around a thin film deposition chamber.
Figure 2:
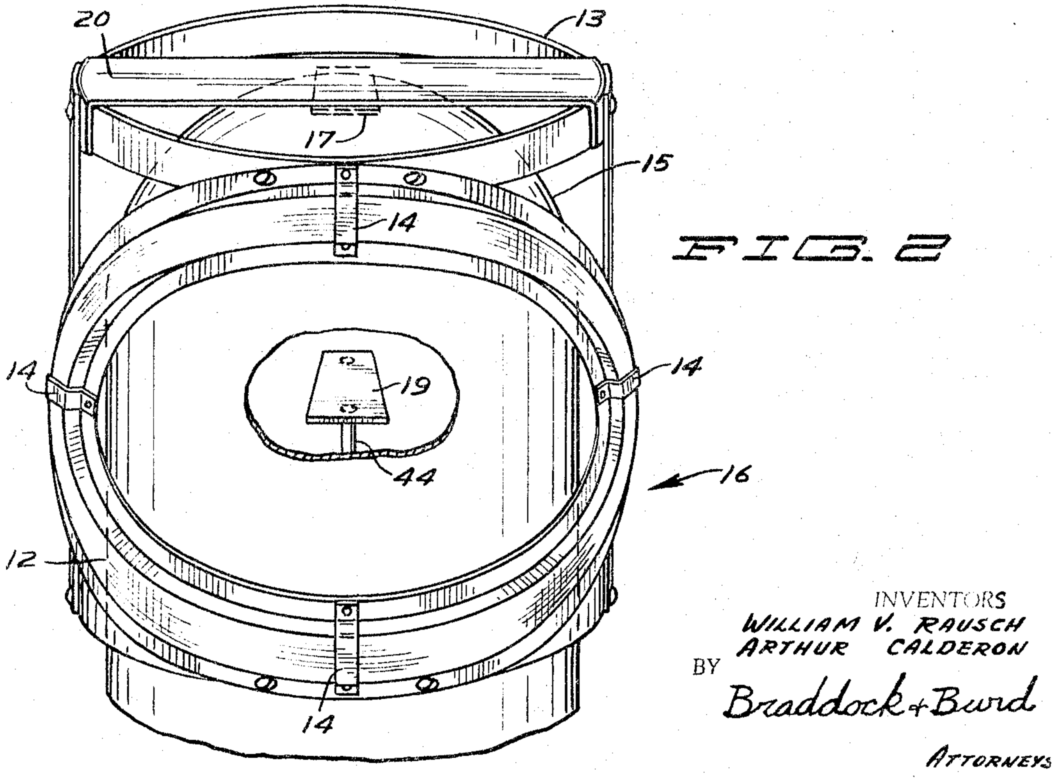
FIG. 2 is a second perspective view of the pair of cylindrically warped elliptical electromagnetic coils of FIG. 1 supported around a thin film deposition chamber.

Referring to the drawings and numerals of reference thereon, in FIGS. 1 and 2 a pair of coils 11 and 12 are mounted on a coil support frame 13 by a set of brackets 14. Coil support frame 13 is placed over a bell jar 15 of a deposition chamber indicated generally at 16. A cover panel 20 of coil support frame 13 rests on a platform 17 secured to the top of bell jar 15 so as to allow a coaxis 18 of coils 11 and 12 to lie in the plane of a substrate 19 which is supported inside of bell jar 15 on a stanchion 44.

Referring to FIGS. 3, 4, 5, and 6 a circular coil 23 is formed into an elliptical coil 24 such that the diameter 25 of the original circular coil 23 is approximately 1.5 times the minor diameter 26 of the elliptical coil. The diameter 27 of the bell jar 15 is approximately equal to the diameter 25 of circular coil 23. After elliptical coil 24 has been formed from circular coil 23, it is formed around a cylindrical mandrel, 32 as in FIG. 6, and then placed around bell jar 15, as shown in FIGS. 1 and 2, so that a plane defined by the now curved major axis 31 of semicircular coils 11 and 12 will coincide with the plane defined by substrate 19.

Figures 3, 4, 5, 6, 7, 8:
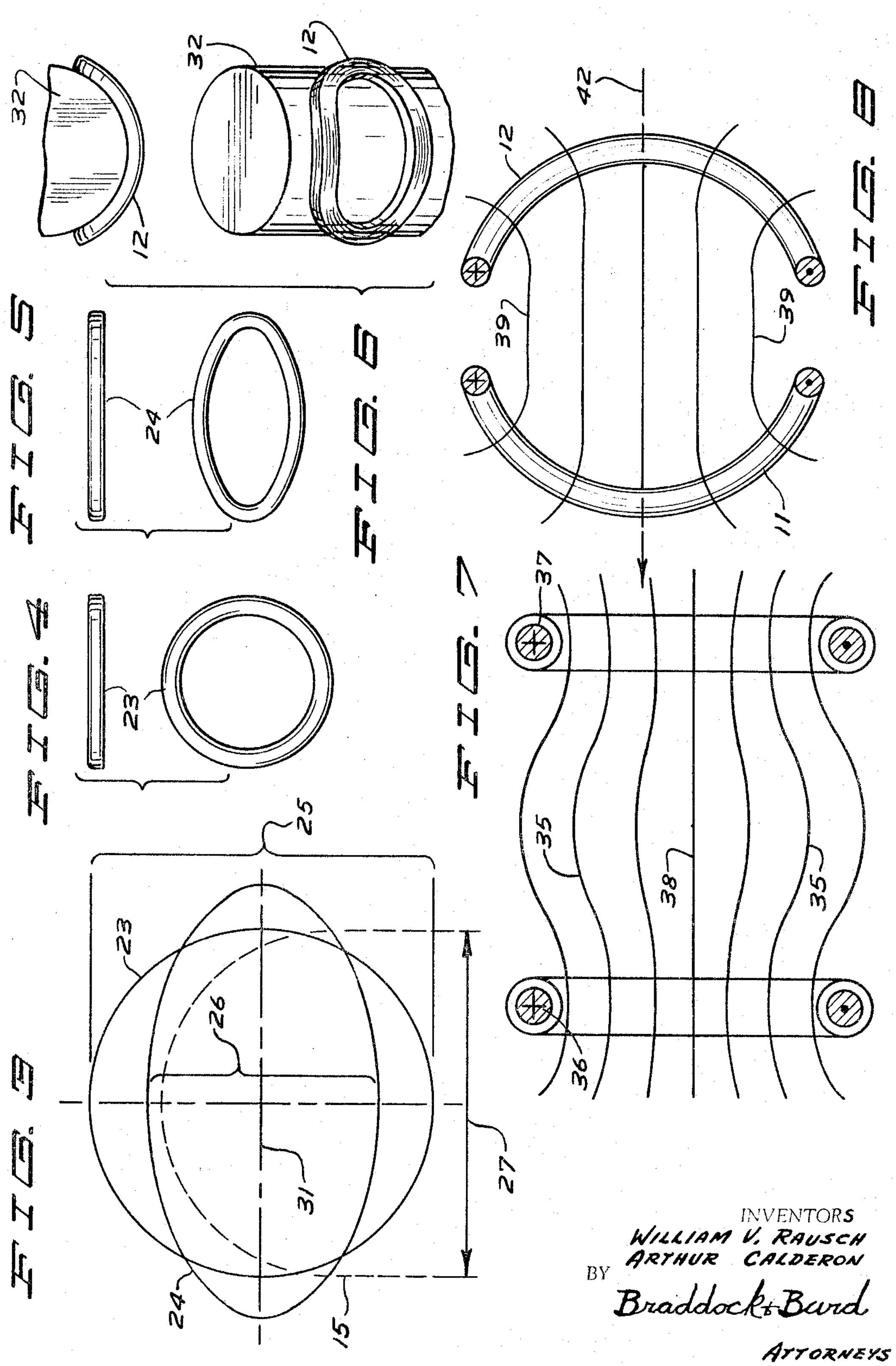
FIG. 3 is a diagram showing the dimensional relationship between a deposition chamber bell jar, original circular coils, and elliptical coils prior to being formed around the bell jar.
FIG. 4 is a combined elevational view and top plan view of an electromagnetic coil of this invention in circular form prior to being altered in shape.
FIG. 5 is a combined elevational view and top plan view of an electromagnetic coil of this invention showing the circular coil of FIG. 4 after having been formed into an elliptical coil.
FIG. 6 is a combined perspective view and top plan view of an electromagnetic coil of this invention showing the elliptical coil of FIG. 5 after having been formed around a cylindrical surface.
FIG. 7 is a top view of representative electromagnetic lines of flux produced by a pair of series aiding planar circular electromagnetic coils which are shown in section.
FIG. 8 is a top view of representative electromagnetic lines of flux produced by a pair of cylindrically elliptical warped coils of this invention which are shown in section.

In FIG. 7 a set of lines of flux 35 represent a portion of the magnetic field created by a pair of series aiding electromagnetic planar, circular coils 36 and 37. Lines of flux 35 can be seen to deviate from a straight and uniform path and to bulge outwardly, the amount of bulge being proportional to the distance from coaxis 38 of coils 36 and 37, and proportional to the coil diameter and spacing.

In FIG. 8 a set of lines of flux 39 represent a corresponding portion of the magnetic field created by a pair of series aiding cylindrically warped elliptical electromagnetic coils 11 and 12 having a coaxis 42. The upper and lower portions of coils 11 and 12 as viewed in FIG. 8, can be visualized as having effectively countered the tendency of lines of flux 39 to bulge in a direction away from coaxis 42. It is thus apparent that resultant magnetic field between coils 11 and 12 is more nearly uniform and unidirectional than in the corresponding area in FIG. 7 between coils 36 and 37. It is also evident from FIGURES 1 through 8 that the overall bulk of the coils is reduced and that the field intensity is increased for the same number of turns and current through each set of coils.

Although this invention has been described with regard to film deposition apparatus, its use is not intended to be thus limited. This invention which allows maximum field uniformity in essentially a planar area for minimum coil bulk, would be useful in numerous other devices such as Kerr apparatus, Bitter pattern studies, and hysteresis loop checking apparatus.

What is claimed is:

1. Apparatus for producing a substantially uniform magnetic field in a planar area comprising: a pair of series aiding electromagnetic coils having the same axis;

said coils being positioned adjacent opposite sides of the planar area; said axis lying in the planar area; each of said coils having a greater diameter in a direction parallel to the planar area than in a direction perpendicular to the planar area; and said coils being curved at least partially around said opposite sides of the planar area so that a surface defined by each of said coils is perpendicular to the planar area.

2. Apparatus for producing a substantially uniform magnetic field in a planar area comprising; a pair of series aiding electromagnetic coils having the same axis; said coils being positioned adjacent opposite sides of the planar area; each of said coils having a greater diameter in a direction parallel to the planar area than in a direction perpendicular to the planar area; and said coils being curved at least partially around said opposite sides of the planar area so that a surface defined by each of said coils is perpendicular to the planar area, and so that the intersection of the surface defined by each of said coils by the plane of the planar area is an arc of a circle.

3. Apparatus for producing a substantially uniform magnetic field in a planar area comprising: a pair of series aiding electromagnetic coils having the same axis, said coils being positioned adjacent opposite sides of the planar area; said axis lying in the plane of the planar area; each of said coils having a greater diameter in a direction parallel to the planar area than in a direction perpendicular to the planar area; and said coils being curved at least partially around said opposite sides of said planar area such that each of said coils defines an elliptical cylindrical surface perpendicular to said planar area.

4. The apparatus of claim 3 in which each of said coils are shaped in an ellipse such that the diameter of each of said coils when forming a circle is 1.5 times the minor axis of each of said coils when shaped in an ellipse.

5. In apparatus for the production of thin films on a substrate material within a cylindrically shaped deposition chamber, means for producing a substantially uniform magnetic field across the planar surface of said substrate material, said means comprising: a pair of series aiding electromagnetic coils having the same axis; said coils being positioned adjacent opposite sides of the substrate material; said axis lying in a plane defined by the substrate material; each of said coils being a cylindrically warped ellipse having a major axis and a minor axis; said minor axes being perpendicular to said plane defined by the substrate material; said major axes lying in said plane defined by the substrate material; and said major axes being approximately twice the length of said minor axes.

References Cited by the Examiner

UNITED STATES PATENTS

| | | | |
|---|---|---|---|
| 3,065,105 | 11/1962 | Pohm | 117—235 |
| 3,092,510 | 6/1963 | Edelman. | |
| 3,131,078 | 4/1964 | Fuller et al. | 117—93.2 X |

BERNARD A. GILHEANY, *Primary Examiner*.

G. HARRIS, *Assistant Examiner*.

UNITED STATES PATENT OFFICE

CERTIFICATE OF CORRECTION

Patent No. 3,309,638 March 14, 1967

William V. Rausch et al.

It is hereby certified that error appears in the above numbered patent requiring correction and that the said Letters Patent should read as corrected below.

In the heading to the printed specification, lines 4 to 6, for "William V. Rausch, 1450 N. Larch Lane, Minneapolis, Minn. 55427, and Arthur Calderon, 2514 Cedarwood Ridge, Minnetonka, Minn. 55343" read -- William V. Rausch, Minneapolis, Minn. and Arthur Calderon, Minnetonka, Minn., assignors to Fabri-Tek Incorporated, Minneapolis, Minn., a corporation of Wisconsin --

Signed and sealed this 7th day of November 1967.

(SEAL)

Attest:

Edward M. Fletcher, Jr.

Attesting Officer

EDWARD J. BRENNER

Commissioner of Patents